US008817305B2

(12) United States Patent
Uruma

(10) Patent No.: US 8,817,305 B2
(45) Date of Patent: Aug. 26, 2014

(54) COMMUNICATION APPARATUS HAVING PC-FAX TRANSMISSION FUNCTION, AND CONTROL METHOD AND STORAGE MEDIUM THEREFOR

(75) Inventor: Kazuhiro Uruma, Yokohama (JP)

(73) Assignee: Canon Kabushiki Kaisha (JP)

( * ) Notice: Subject to any disclaimer, the term of this patent is extended or adjusted under 35 U.S.C. 154(b) by 165 days.

(21) Appl. No.: 13/617,142

(22) Filed: Sep. 14, 2012

(65) Prior Publication Data

US 2013/0120789 A1    May 16, 2013

(30) Foreign Application Priority Data

Nov. 16, 2011    (JP) .................................. 2011-250540

(51) Int. Cl.
*G06F 3/12*    (2006.01)

(52) U.S. Cl.
USPC ....... 358/1.15; 358/1.14; 358/1.13; 358/1.16; 709/206

(58) Field of Classification Search
CPC .............. H04B 2201/3209; H04N 2201/3212; G04B 2201/3221
USPC ...................... 358/1.13, 1.9, 1.14, 1.15, 1.18; 707/999.003
See application file for complete search history.

(56) References Cited

U.S. PATENT DOCUMENTS

| | | | | |
|---|---|---|---|---|
| 6,108,691 | A * | 8/2000 | Lee et al. ....................... | 709/206 |
| 7,706,003 | B2 * | 4/2010 | Uruma .......................... | 358/1.14 |
| 8,112,437 | B1 * | 2/2012 | Katragadda et al. ........... | 707/769 |
| 8,189,218 | B2 * | 5/2012 | Kim .............................. | 358/1.15 |
| 8,260,866 | B2 * | 9/2012 | Kobayashi et al. ............ | 709/206 |
| 8,332,468 | B2 * | 12/2012 | Song et al. ..................... | 709/203 |
| 8,645,475 | B2 * | 2/2014 | Akita et al. .................... | 709/206 |
| 2001/0042103 | A1 * | 11/2001 | Tomari et al. ................. | 709/206 |
| 2003/0058478 | A1 * | 3/2003 | Aoki .............................. | 358/402 |
| 2003/0065786 | A1 * | 4/2003 | Park et al. ...................... | 709/227 |
| 2004/0097188 | A1 * | 5/2004 | Tanimoto ...................... | 455/3.06 |
| 2004/0243562 | A1 * | 12/2004 | Josenhans ......................... | 707/3 |
| 2007/0263853 | A1 * | 11/2007 | Pearson et al. ............. | 379/413.03 |
| 2007/0268526 | A1 * | 11/2007 | Ito et al. ........................ | 358/403 |
| 2007/0268906 | A1 * | 11/2007 | Shozaki et al. ............... | 370/392 |
| 2008/0021962 | A1 * | 1/2008 | Ryan et al. .................... | 709/206 |
| 2008/0047020 | A1 * | 2/2008 | Masui ............................ | 726/26 |
| 2008/0065647 | A1 * | 3/2008 | Hinohara ........................ | 707/10 |
| 2008/0070553 | A1 * | 3/2008 | Yamakawa et al. ........... | 455/413 |
| 2009/0091788 | A1 * | 4/2009 | Yoshida et al. .............. | 358/1.15 |
| 2009/0094254 | A1 * | 4/2009 | Akita et al. .................... | 707/10 |
| 2009/0100071 | A1 * | 4/2009 | Kobayashi et al. ............. | 707/10 |
| 2009/0201539 | A1 * | 8/2009 | Sawayanagi et al. ........ | 358/1.15 |

FOREIGN PATENT DOCUMENTS

JP    2008-258795 A    10/2008

* cited by examiner

*Primary Examiner* — Dennis Dicker
(74) *Attorney, Agent, or Firm* — Rossi, Kimms & McDowell LLP

(57) ABSTRACT

A communication apparatus that can leave a transmission history including transmission destination information as well as transmission destination dial information at the time of PC-FAX transmission. A facsimile apparatus, which is a communication apparatus having a PC-FAX transmission function, acquires transmission destination dial information from a facsimile transmission request received from a client terminal, searches an address book database registered in the facsimile apparatus to find an address book including transmission destination dial information coincident with the acquired dial information, and performs facsimile transmission based on the acquired transmission destination dial information. If an address book including transmission destination dial information coincident with the acquired dial information is found by the search, a transmission history is stored that includes dial information and transmission destination information that are registered in the address book found by the search.

15 Claims, 9 Drawing Sheets

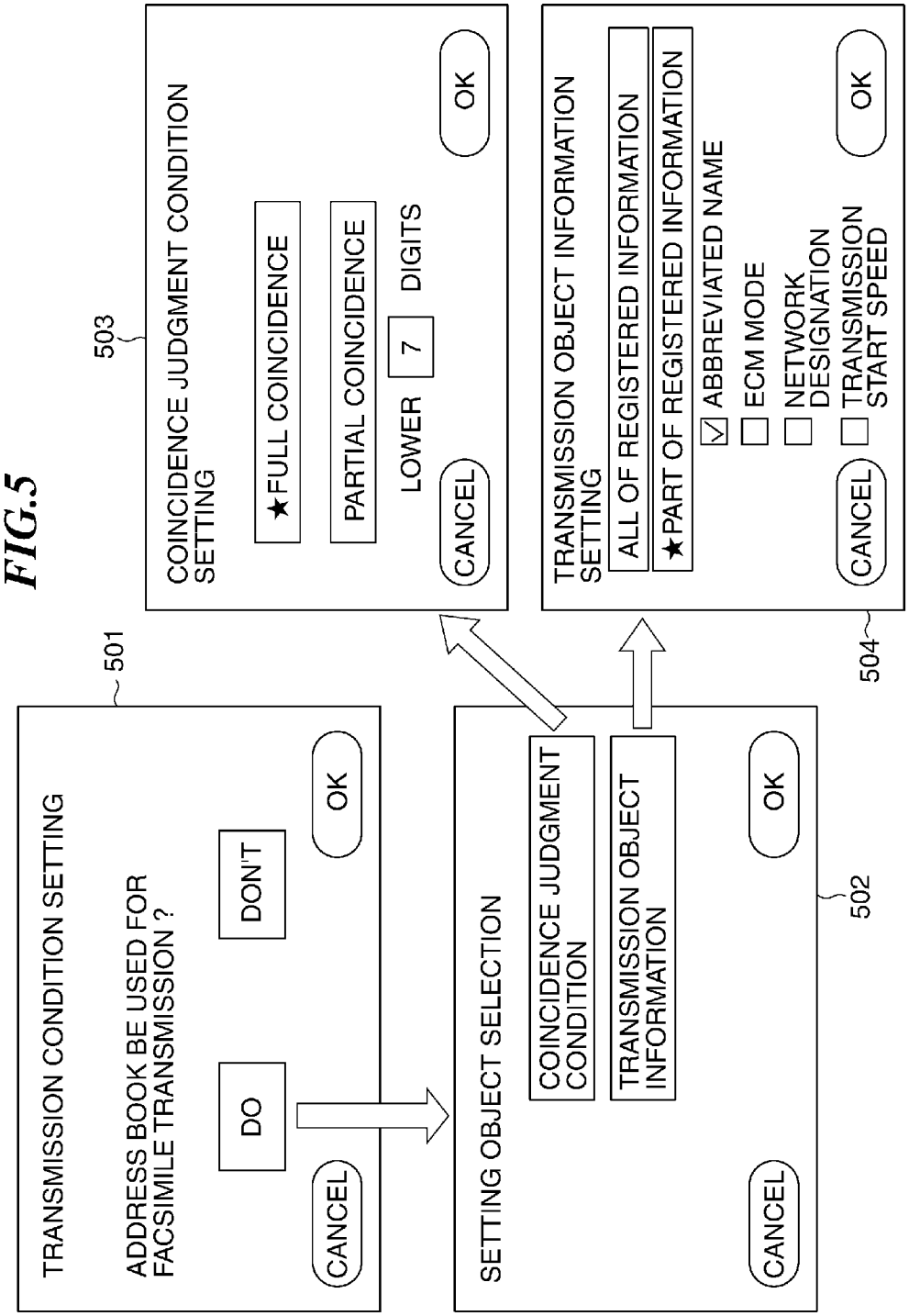

FIG.6A 2010 12/12 FRI 11:11 FAX 04411122222 MANAGEMENT DIVISION OF A COMPANY          P001/001

```
***********************************
** FAX COMMUNICATION MANAGEMENT REPORT **
***********************************
```

| START TIME | COUNTERPART ADDRESS | NUMBER | COMMUNICATION MODE | NUMBER OF SHEETS | RESULT |
|---|---|---|---|---|---|
| *12/10 15:00 | MANAGEMENT DIVISION OF B COMPANY  04411122222 | 0017 | TRANSMISSION ECM | 3 | OK 00'40 |
| *12/11 16:00 | MANAGEMENT DIVISION OF B COMPANY  04411122222 | 0018 | TRANSMISSION ECM | 1 | OK 00'20 |
| 12/12 15:00 | MANAGEMENT DIVISION OF C COMPANY  04411133333 | 0019 | TRANSMISSION ECM | 3 | OK 00'55 |
| 12/13 15:00 | MANAGEMENT DIVISION OF D COMPANY  04411144444 | 0020 | TRANSMISSION ECM | 2 | OK 00'30 |
| 12/13 15:10 | MANAGEMENT DIVISION OF E COMPANY  04411155555 | 0021 | TRANSMISSION ECM | 3 | OK 00'56 |

601 — START TIME
602 — COUNTERPART ADDRESS
603 — NUMBER
604 — COMMUNICATION MODE
605 — NUMBER OF SHEETS
606 — RESULT

FIG.6B PRIOR ART 2010 12/12 FRI 11:11 FAX 04411122222 MANAGEMENT DIVISION OF A COMPANY        P001/001

```
********************************
** FAX COMMUNICATION MANAGEMENT REPORT **
********************************
```

| START TIME | COUNTERPART ADDRESS | NUMBER | COMMUNICATION MODE | NUMBER OF SHEETS | RESULT |
|---|---|---|---|---|---|
| *12/10 15:00 | 04411122222 | 0017 | TRANSMISSION ECM | 3 | OK 00'40 |
| *12/11 16:00 | 04411122222 | 0018 | TRANSMISSION ECM | 1 | OK 00'20 |
| 12/12 15:00 | 04411133333 | 0019 | TRANSMISSION ECM | 3 | OK 00'55 |
| 12/13 15:00 | 04411144444 | 0020 | TRANSMISSION ECM | 2 | OK 00'30 |
| 12/13 15:10 | 04411155555 | 0021 | TRANSMISSION ECM | 3 | OK 00'56 |

COMMUNICATION APPARATUS HAVING PC-FAX TRANSMISSION FUNCTION, AND CONTROL METHOD AND STORAGE MEDIUM THEREFOR

BACKGROUND OF THE INVENTION

1. Field of the Invention

The present invention relates to a communication apparatus having a PC-FAX transmission function, a control method therefor, and a storage medium storing a program for executing the control method.

2. Description of the Related Art

Some facsimile apparatus is configured to be capable of performing so-called PC-FAX transmission in which facsimile transmission is carried out in response to a facsimile transmission request received from a client terminal such as a PC through a network. To make a request for PC-FAX transmission from such a client terminal, a user selects a transmission destination dial number from an address book stored in the client terminal or operates ten-keys of the client terminal, thereby inputting the transmission destination dial number.

Recently there has been proposed a client terminal that acquires from a facsimile apparatus through a network an address book stored therein and selects a transmission destination dial number from the acquired address book (see, for example, Japanese Laid-open Patent publication No. 2008-258795).

The proposed client terminal acquires destination list information registered in the facsimile apparatus and reflects the acquired information to destination list information registered in the client terminal. Accordingly, the destination list either in the client terminal or in the facsimile apparatus can be selected to make a request for PC-FAX transmission, and the transmission destination dial information in the selected destination list and transmission destination information can be left in a transmission history.

However, in a case where the user inputs a transmission destination dial number through the ten-keys of the client terminal, only the dial information can be left in the facsimile transmission history.

SUMMARY OF THE INVENTION

The present invention provides a communication apparatus that can leave a transmission history including transmission destination information as well as transmission destination dial information at the time of PC-FAX transmission, and a control method for the communication apparatus and a storage medium storing a program for executing the control method.

According to one aspect of this invention, there is provided a communication apparatus having a PC-FAX transmission function for performing facsimile transmission in response to a facsimile transmission request received from a client terminal through a network, which comprises at least one address book in which transmission destination dial information and corresponding transmission destination information are registered, an acquisition unit configured to acquire transmission destination dial information from the facsimile transmission request, a search unit configured to search the at least one address book to find an address book registered with transmission destination dial information coincident with the transmission destination dial information acquired by the acquisition unit, a transmission unit configured to perform facsimile transmission based on the transmission destination dial information acquired by the acquisition unit, and a storage unit configured, in a case where the address book registered with the transmission destination dial information coincident with the transmission destination dial information acquired by the acquisition unit is found by the search unit, to store a transmission history including the transmission destination dial information and transmission destination information that are registered in the address book found by the search unit.

With this invention, even if only transmission destination dial information and transmission data are received from the client terminal, it is possible to leave a transmission history that includes transmission destination information registered in an address book in the communication apparatus, thereby making it possible to improve user-friendliness.

Further features of the present invention will become apparent from the following description of exemplary embodiments with reference to the attached drawings.

BRIEF DESCRIPTION OF THE DRAWINGS

FIG. 5 is a view showing an example setting screen displayed on an operation/display unit of the facsimile apparatus and used for setting conditions for facsimile transmission;

FIG. 6A is a view showing an example output of a fax communication management report in the second embodiment;

FIG. 6B is a view showing an example output of a conventional fax communication management report;

DESCRIPTION OF THE EMBODIMENTS

The present invention will now be described in detail below with reference to the drawings showing preferred embodiments thereof.

(First Embodiment)

Figure 1:
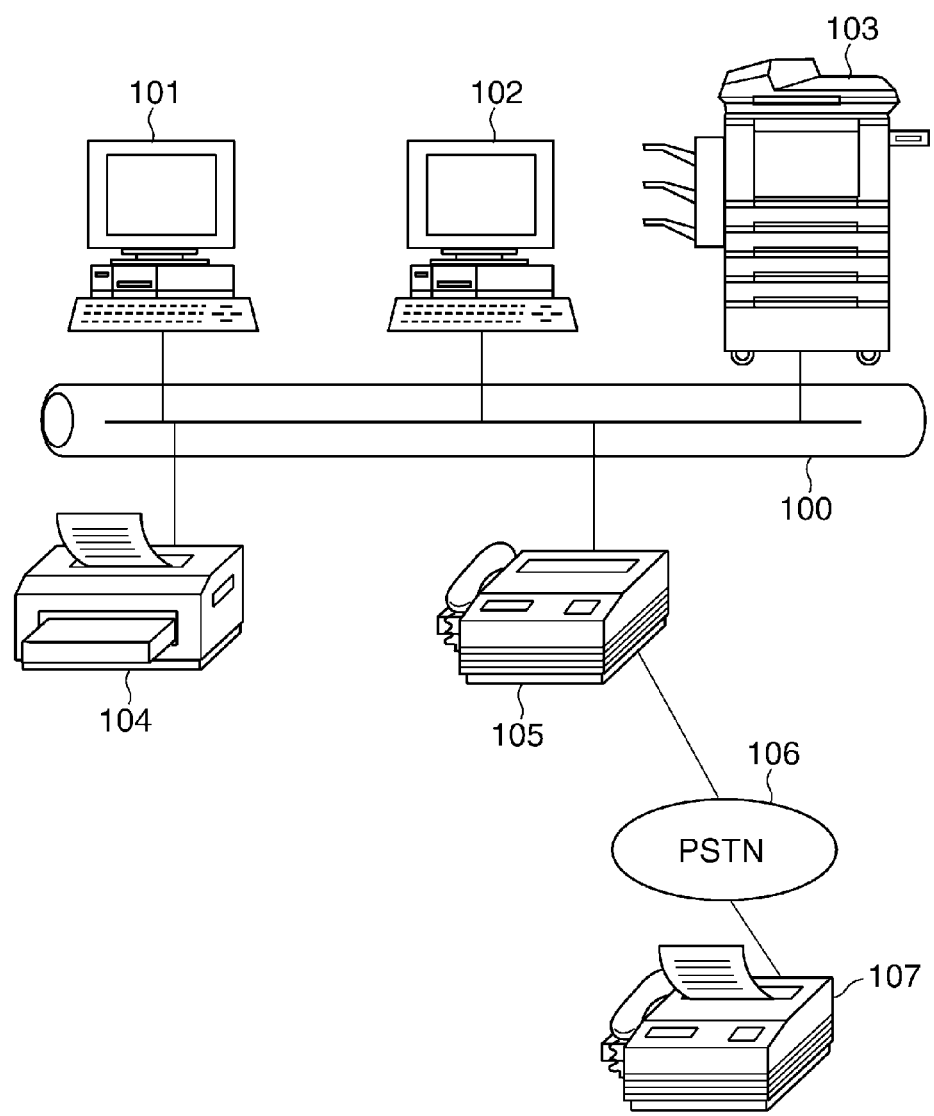
FIG. 1 is a schematic view showing a network environment including a facsimile apparatus, which is an example of a communication apparatus according to a first embodiment of this invention.

FIG. 1 schematically shows a network environment that includes a facsimile apparatus, which is an example of a communication apparatus according to a first embodiment of this invention.

In FIG. 1, the facsimile apparatus denoted by reference numeral 105 has a PC-FAX transmission function for performing facsimile transmission in response to a PC-FAX transmission request received from a client terminal 101 or 102 via a network 100. The facsimile apparatus 105 performs facsimile communication with a facsimile apparatus 107 via a PSTN 106.

The client terminals 101, 102 each constituted by, e.g., a personal computer (PC) are capable of transmitting a PC-FAX transmission request to the facsimile apparatus 105 via the network 100 and capable of transmitting a print request to a multi-function peripheral 103 or to a printer 104 via the network 100.

Figure 2:
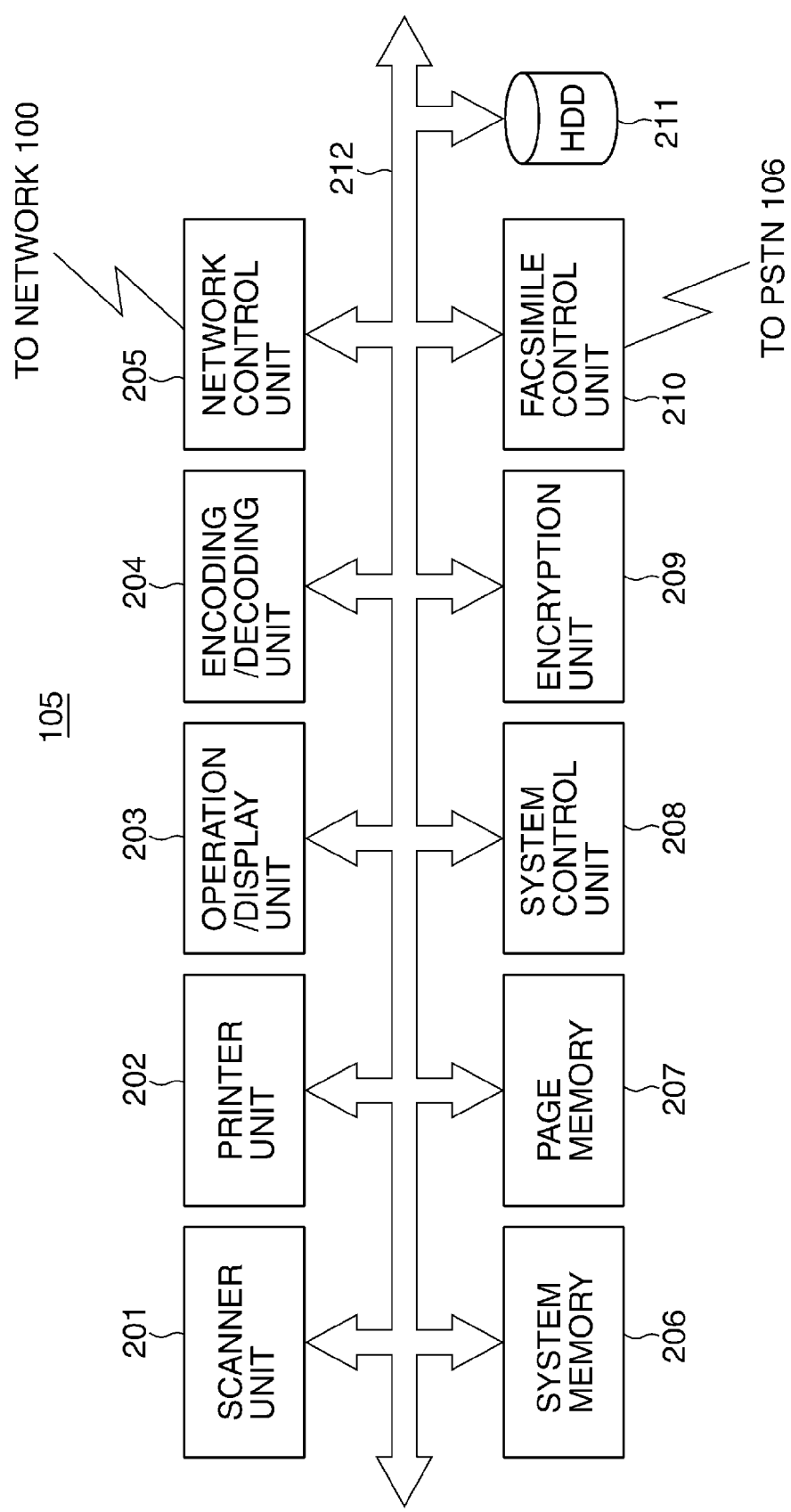
FIG. 2 is a functional block diagram of the facsimile apparatus.

FIG. 2 shows in block diagram a functional structure of the facsimile apparatus 105.

In the facsimile apparatus 105, a scanner unit 201 scans an original in a specified mode (e.g., with specified sheet size, resolution, density, etc.). A printer unit 202 prints image data on a sheet and discharges the printed sheet to a sheet discharge tray through a sheet discharge unit (not shown) such as a finisher. An operation/display unit 203 has an operation part through which various operations can be performed by a user and a display part on which various pieces of information can be displayed.

An encoding/decoding unit 204 encodes and compresses transmission image data, and decompresses and decodes received compressed image data. A network control unit 205 is connected to the network 100 and exchanges information with network devices 101 to 105 and 107 through the network 100. A system memory 206 is constituted by a RAM, SRAM, ROM, or the like and stores information that is to be registered in the facsimile apparatus 105. A page memory 207 is a memory on which image data of one page is developed when the image data is encoded and decrypted.

A system control unit 208 is constituted by, e.g., a microcomputer, and monitors and controls respective parts of the facsimile apparatus 105 such as an HDD (hard disk drive) 211. An encryption unit 209 encrypts image data encoded by the encoding/decoding unit 204. The image data encoded by the encoding/decoding unit 204 can be stored into the HDD 211 after being encrypted or without being encrypted by the encryption unit 209.

A facsimile control unit 210 is connected to the PSTN 106 (facsimile network) and capable of communicating with the facsimile apparatus 107 through the PSTN 106. The HDD 211 stores, e.g., image data of received documents and image data of documents scanned by the scanner unit 201.

Next, with reference to FIG. 3, a description will be given of the flow of a PC-FAX transmission process performed by the facsimile apparatus 105.

Figure 3:
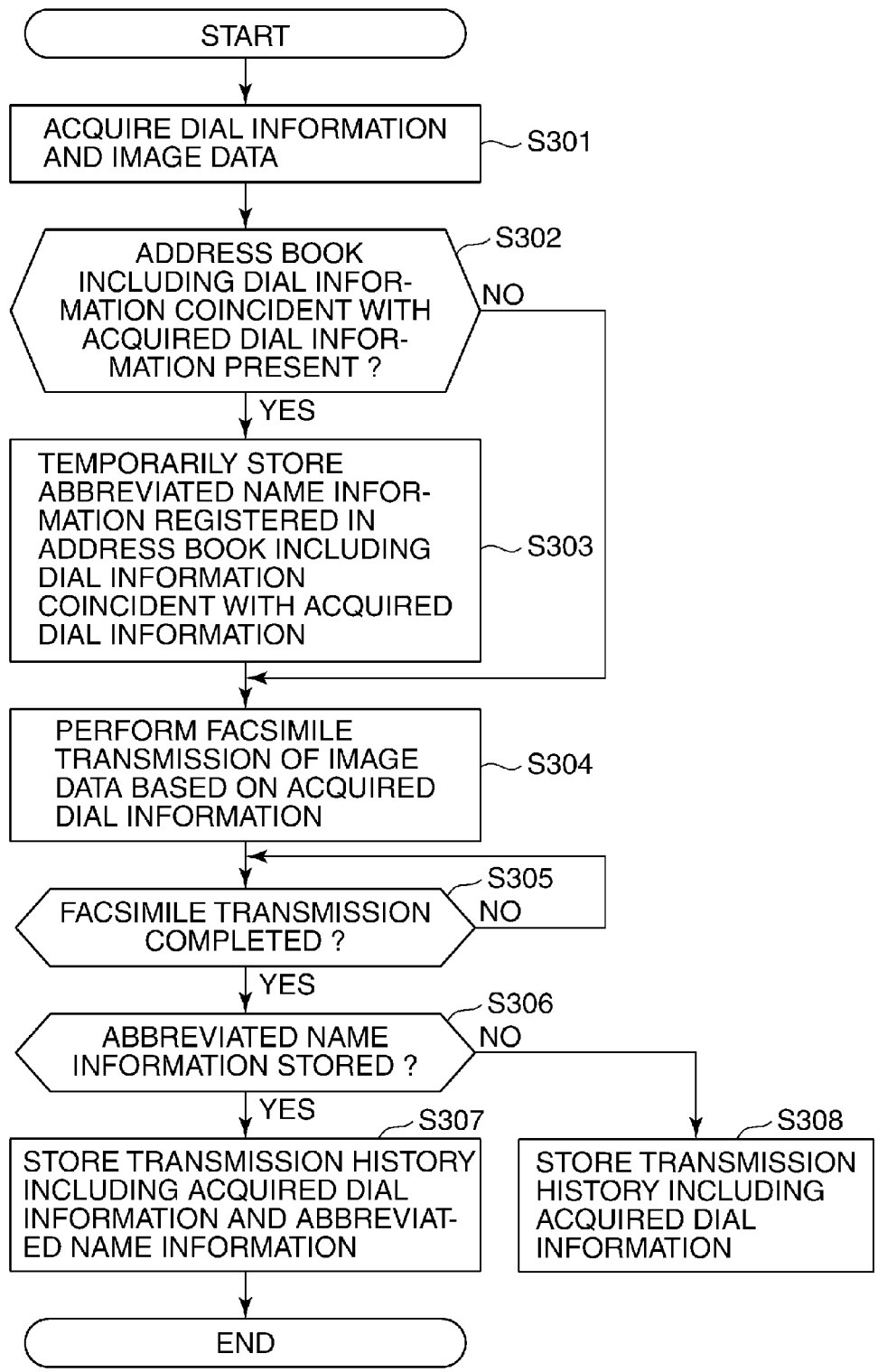
FIG. 3 is a flowchart showing a PC-FAX transmission process performed by the facsimile apparatus.

FIG. 3 shows in flowchart the PC-FAX transmission process performed by the facsimile apparatus 105.

When receiving from the client terminal 101 or 102 through the network 100 a PC-FAX transmission request including transmission destination dial information that represents a transmission destination dial number input through the ten-keys and including transmission image data (facsimile transmission image), the facsimile apparatus 105 operates as described below.

In step S301, the network control unit 205 of the facsimile apparatus 105 acquires transmission destination dial information and image data from the PC-FAX transmission request received from the client terminal 101 or 102. The transmission destination dial information is temporarily stored into the system memory 206, and the image data is stored into the HDD 211.

In step S302, the facsimile control unit 210 searches an address book database stored in the system memory 206 and registered with plural pieces of address book information, each of which includes transmission-related information (e.g., transmission destination dial information, abbreviated transmission destination name information, network designation information, and ECM (error correction mode) information). Then, the facsimile control unit 210 determines whether there is any address book in the address book database that includes transmission destination dial information coincident with the dial information acquired in step S301.

If the answer to step S302 is YES, the flow proceeds to step S303. On the other hand, if the answer to step S302 is NO, the flow proceeds to step S304.

In step S303, the facsimile control unit 210 acquires abbreviated transmission destination name information registered in the address book that includes the dial information coincident with the transmission destination dial information acquired in step S301, and temporarily stores the acquired name information into the system memory 206.

In step S304, the facsimile control unit 210 performs dialing based on the dial information acquired in step S301, and facsimile-transmits image data, which has been stored into the HDD 211 in step S301, to the transmission destination (e.g., facsimile apparatus 107) through the PSTN 106.

In step S305, the facsimile control unit 210 monitors the facsimile transmission and determines whether the facsimile transmission is completed. Upon completion of the facsimile transmission, the facsimile control unit 210 determines whether abbreviated transmission destination name information is stored in the system memory 206 (step S306). If the answer to step S306 is YES, the facsimile control unit 210 stores a facsimile transmission history (that includes the transmission destination dial information acquired in step S301 and the abbreviated transmission destination name information temporarily stored in step S303) into the system memory 206 (step S307).

On the other hand, when determining in step S306 that abbreviated transmission destination name information is not stored in the system memory 206, the facsimile control unit 210 stores a facsimile transmission history that includes the transmission destination dial information acquired in step S301 into the system memory 206 (step S308).

With the first embodiment, even if a PC-FAX transmission request that only includes transmission destination dial information and transmission image data is received from a client terminal, a facsimile transmission history can be left that includes transmission destination information (e.g., abbreviated transmission destination name information) registered in an address book in the facsimile apparatus together with transmission destination dial information, whereby user-friendliness can be improved.

(Second Embodiment)

A communication apparatus according to a second embodiment of this invention is the same as that of the first embodiment in that it has the construction shown in FIGS. 1 and 2. In the following, points different from the first embodiment will only be described.

Figure 4A:
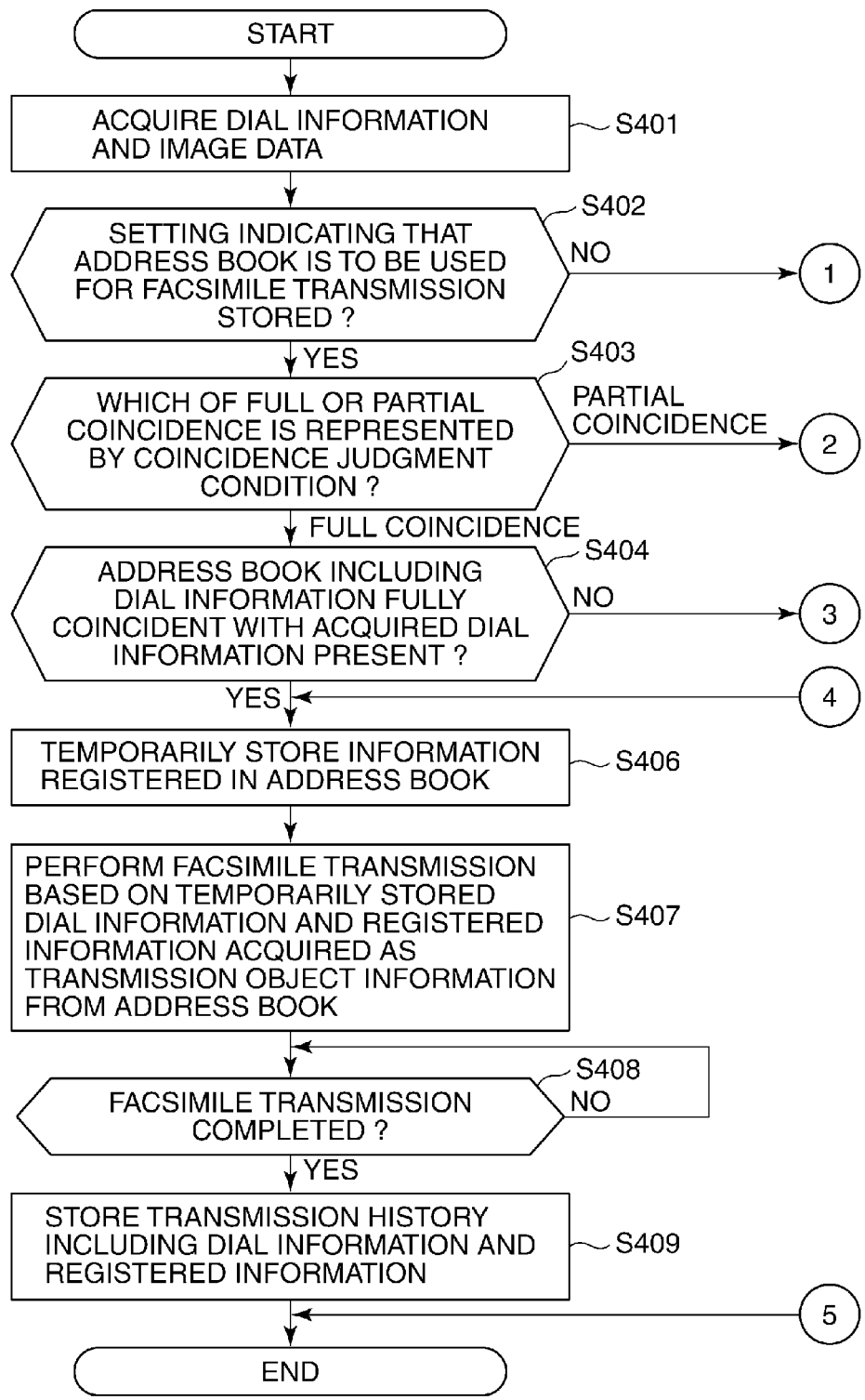
FIGS. 4A and 4B are a flowchart showing a PC-FAX transmission process performed by a facsimile apparatus, which is an example of a communication apparatus according to a second embodiment of this invention.
Figure 4B:
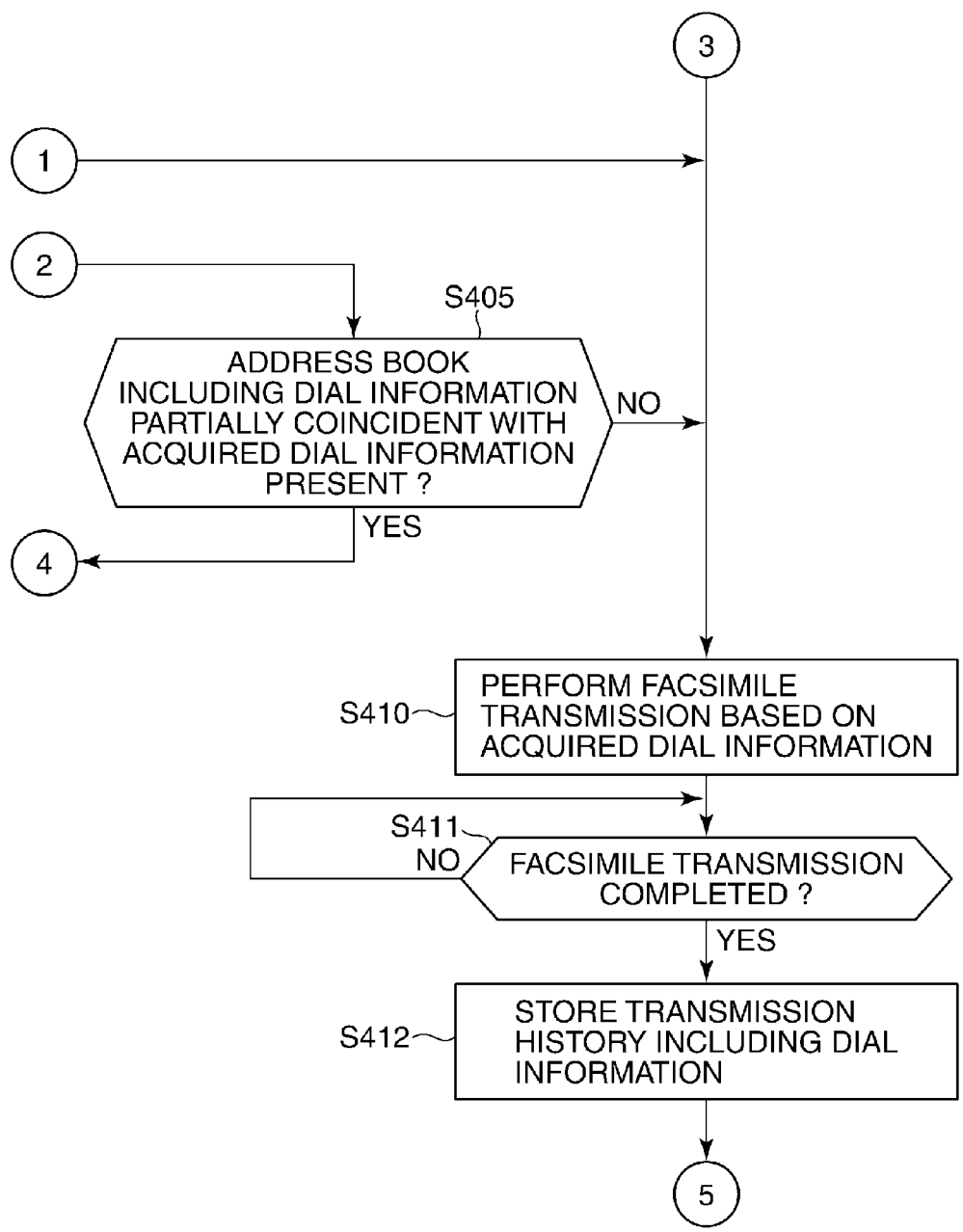

FIGS. 4A and 4B show in flowchart a PC-FAX transmission process performed by the facsimile apparatus 105, which is an example of the communication apparatus according to the second embodiment.

When receiving from the client terminal 101 or 102 through the network 100 a PC-FAX transmission request including transmission destination dial information that represents a transmission destination dial number input through the ten-keys and including transmission image data, the facsimile apparatus 105 executes the PC-FAX transmission process of FIGS. 4A and 4B in accordance with facsimile transmission conditions that have been set on a setting screen shown in FIG. 5.

FIG. 5 shows an example of the setting screen which is displayed on the operation/display unit 203 of the facsimile apparatus 105 and on which conditions for facsimile transmission can be set.

A transmission condition setting screen 501 is displayed on the operation/display unit 203 when a "transmission condition setting" option (not shown) is selected on a user mode menu screen (not shown) displayed on the operation/display unit 203. On the setting screen 501, there are displayed "Do" and "Don't" buttons for selecting whether an address book is to be used for facsimile transmission.

When the "Don't" button and an "OK" button are successively pressed on the setting screen 501, a setting indicating that an address book is not to be used for facsimile transmission is stored into the system memory 206, and the setting screen 501 is changed over to the menu screen.

On the other hand, when the "Do" button is pressed on the setting screen 501, the setting screen 501 is changed over to a setting object selection screen 502. In a case that an address book is used for facsimile transmission, the facsimile apparatus 105 is caused to search an address book database in the facsimile apparatus 105 to find an address book that includes transmission destination dial information partially or fully coincident with transmission destination dial information received from the client terminal 101 or 102. Then, all or part of transmission-related information (including transmission destination information) registered in the address book found by the search is set as transmission object information. To this end, there are displayed on the selection screen 502 a "coincidence judgment condition" option for shifting to a setting of coincidence judgment condition about transmission destination dial information and a "transmission object information" option for shifting to a setting of transmission object information.

It should be noted that it is possible to cause the selection screen 502 to display other options such as a "notification to client terminal" option for shifting to a setting of notification of the address book found by the search to the client terminal, which is the source of facsimile transmission request.

When the "coincidence judgment condition" option is selected on the selection screen 502, the selection screen 502 is changed over to a coincidence judgment condition setting screen 503. On the setting screen 503, there are displayed a "full coincidence" option for causing the facsimile apparatus 105 to search the address book database to find an address book that includes transmission destination dial information fully coincident with transmission destination dial information received from the client terminal 101 or 102, and a "partial coincidence" option for causing the facsimile apparatus 105 to search the address book database to find an address book that includes transmission destination dial information whose lower digits that can arbitrarily be designated (lower seven digits in the illustrated example) are coincident with lower digits of the received transmission destination dial information (i.e., an address book that includes transmission destination dial information partially coincident with the received transmission destination dial information).

Generally, dial information without area code and dial information with area code represent the same transmission destination. In the partial coincidence judgment, the coincidence judgment condition is satisfied by the coincidence of lower seven digits, for example. In a case, for example, that transmission destination dial information "111-2222" is received from the client terminal 101 or 102 and transmission destination dial information "044-111-2222" is present in the address book database, it is judged that these two pieces of dial information are coincident with each other.

When the "full coincidence" or "partial coincidence" option and the "OK" button are successively pressed on the coincidence judgment condition setting screen 503, the selected coincidence judgment condition is set and stored into the system memory 206, and the setting screen 503 is changed over to the setting object selection screen 502. When the "Cancel" button is pressed on the setting screen 503, the setting that has been set on the setting screen 503 is cancelled, and the setting screen 503 is changed over to the selection screen 502.

When the "transmission object information" option is selected on the selection screen 502, the selection screen 502 is changed over to a transmission object information setting screen 504. On the setting screen 504, there are displayed an "All of registered information" option for setting, as transmission object information, all the pieces of transmission-related information which are registered in an address book that includes transmission destination dial information coincident with transmission destination dial information received from the client terminal 101 or 102, if such address book is present in the address book database, a "Part of registered information" option for setting transmission of part of transmission-related information registered in the address book, and check boxes for designating part of the registered information as the transmission object information.

In this embodiment, each address book is registered with four types of transmission-related information (abbreviated name information, ECM information, network designation information, and transmission start speed information), and four check boxes corresponding to the four types of registered information are displayed on the setting screen 504. When the "Part of registered information" option is selected on the setting screen 504, one or two or three among the four check boxes can be checked. In the illustrated example, the "abbreviated name" check box is checked. In that case, among pieces of information registered in the address book that includes transmission destination dial information coincident with the transmission destination dial information received from the client terminal 101 or 102, the abbreviated name information is set as the transmission object information.

When the "OK" button is pressed after the "All of registered information" option is selected on the setting screen 504 or when the "OK" button is pressed after the "Part of registered information" option is selected and the arbitrary one or two or three check boxes are checked, the setting in which the selected one or more pieces of registered information are set as the transmission object information is stored into the system memory 206, and the setting screen 504 is changed over to the setting object selection screen 502. When the "Cancel" button is pressed on the setting screen 504, the setting set on the screen 504 is cancelled and the setting screen 504 is changed over to the selection screen 502.

When the "OK" button is pressed on the selection screen 502, the selection screen 502 is changed over to the transmission condition setting screen 501, while maintaining the setting that has been set on the setting screens 503, 504 and stored into the system memory 206. On the other hand, when the "Cancel" button is pressed on the selection screen 502, the setting set on the setting screens 503, 504 and stored into the system memory 206 is cleared, and the selection screen 502 is changed over to the setting screen 501.

When the "OK" button is pressed on the setting screen 501, the setting screen 501 is changed over to the menu screen, while maintaining the setting set on the setting screens 501, 503 and 504 and stored into the system memory 206. On the other hand, when the "Cancel" button is pressed on the setting screen 501, the setting set on the setting screens 501, 503 and 504 and stored into the system memory 206 is canceled, and the setting screen 501 is changed over to the menu screen.

As previously described, when a PC-FAX transmission request is received from the client terminal 101 or 102 through the network 100, the transmission process shown in FIGS. 4A and 4B is performed by the facsimile apparatus 105.

In step S401, the network control unit 205 of the facsimile apparatus 105 acquires transmission destination dial information and image data (facsimile transmission image) from the PC-FAX transmission request received from the client terminal 101 or 102, temporarily stores the dial information into the system memory 206, and stores the image data into the HDD 211.

Next, in step S402, the facsimile control unit 210 determines whether the setting indicating that an address book is to be used for facsimile transmission is stored in the system memory 206. If the answer to step S402 is YES, the flow proceeds to step S403. On the other hand, if the answer to step S402 is NO, the flow proceeds to step S410.

In step S403, the facsimile control unit 210 determines whether the coincidence judgment condition set and stored in the system memory 206 represents "full coincidence" or "partial coincidence". If it is determined in step S403 that the coincidence judgment condition represents "full coincidence", the flow proceeds to step S404. On the other hand, if it is determined that the coincidence judgment condition represents "partial coincidence", the flow proceeds to step S405.

In step S404, the facsimile control unit 210 searches the address book database stored in the system memory 206 and determines whether the address book database is registered with an address book that includes dial information fully coincident with the dial information that has been acquired and temporarily stored into the system memory 206 in step S401. If the answer to step S404 is YES, the flow proceeds to step S406. On the other hand, if the answer to step S404 is NO, the flow proceeds to step S410.

In step S405, the facsimile control unit 210 searches the address book database stored in the system memory 206 and determines whether the address book database is registered with an address book that includes dial information partially coincident with the dial information acquired and temporarily stored into the system memory 206 in step S401. If the answer to step S405 is YES, the flow proceeds to step S406. On the other hand, if the answer to step S405 is NO, the flow proceeds to step S410.

In step S406, facsimile control unit 210 temporarily stores into the system memory 206 dial information that is fully or partially coincident with the dial information acquired and temporarily stored in the system memory 206 in step S401. Then, the facsimile control unit 210 acquires, from the address book including the dial information, transmission-related information registered therein, and temporarily stores the acquired transmission-related information into the system memory 206.

Next, in step S407, the facsimile control unit 210 acquires transmission object information from the transmission-related information that has been stored in step S406. More specifically, in a case where the "All of registered information" option has been selected on the setting screen 504 shown in FIG. 5, whereby the setting indicating that all the pieces of registered information are to be set as the transmission object information has been stored in the system memory 206, the facsimile control unit 210 acquires, as the transmission object information, all the transmission-related information stored in step S406. On the other hand, in a case where the "Part of registered information" option has been selected on the setting screen 504 and one or two or three of the four check boxes corresponding to the four types of registered information have been checked, whereby the setting indicating that part of registered information is to be set as the transmission object information has been stored in the system memory 206, the facsimile control unit 210 acquires, as the transmission object information, part of the transmission-related information stored in step S406.

Then, the facsimile control unit 210 creates a transmission source record header based on the transmission destination dial information that has been acquired and temporarily stored into the system memory 206 in step S406 and the transmission-related information that has been acquired as the transmission object information from the address book including the transmission destination dial information. Then, the facsimile control unit 210 creates transmission image data by adding the transmission source record header to the image data that has been acquired and stored into the HDD 211 in step S401. Next, the facsimile control unit 210 performs calling in accordance with the transmission destination dial information temporarily stored into the system memory 206, and performs facsimile transmission to transmit the transmission image data to the transmission destination (e.g., facsimile apparatus 107) through the PSTN 106.

Next, in step S408, the facsimile control unit 210 monitors the facsimile transmission. When the completion of facsimile transmission is determined, the flow proceeds to step S409. In step S409, the facsimile control unit 210 stores into the system memory 206 a facsimile transmission history including the dial information and transmission-related information (registered information) in the transmission source record header that has been added to the image data and transmitted in step S407.

In step S410, the facsimile control unit 210 performs calling in accordance with the transmission destination dial information that has been acquired and temporarily stored into the system memory 206 in step S401, and facsimile-transmits the image data that has been acquired and stored into the HDD 211 in step S401. Next, in step S411, the facsimile control unit 210 monitors facsimile transmission. When the completion of facsimile transmission is determined, the flow proceeds to step S412 where a facsimile transmission history that includes the transmission destination dial information that has been acquired in step S401 is stored into the system memory 206.

FIGS. 6A and 6B show an example output of a fax communication management report in the second embodiment and an example output of a conventional fax communication management report, respectively.

As shown in FIG. 6A, the fax communication management report in the second embodiment includes a start time field 601 in which a transmission start time is indicated, a counterpart address filed 602 in which a counterpart abbreviated name and a telephone number are indicated, a number field 603 in which an acceptance number is indicated, a communication mode field 604 in which a communication mode at the time of facsimile transmission such as direct transmission or memory transmission is indicated, a number of sheets field 605 in which the number of sheets transmitted is indicated, and a result field 606 in which a transmission result and a communication time are indicated.

As previously described, in the second embodiment, a facsimile transmission history is stored into the system memory 206 that includes transmission destination dial information fully or partially coincident with transmission destination dial information acquired from a PC-FAX transmission request from the client terminal 101 or 102 and that includes registered information acquired as transmission object information from the address book that includes the transmission destination dial information.

Then, the fax communication management report of FIG. 6A is created based on the facsimile transmission history. Accordingly, in a case where the "All of registered information" option has been selected on the transmission object information setting screen 504 shown in FIG. 5, whereby the setting indicating that all the pieces of registered information (including abbreviated transmission destination name information) are to be set as transmission object information has been stored in the system memory 206, or in a case where the "Part of registered information" option has been selected on the setting screen 504 and one or more check boxes associated with at least abbreviated transmission destination name information have been checked, whereby the setting indicating that at least abbreviated transmission destination name information is to be set as transmission object information has been stored in the system memory 206, abbreviated name information (an abbreviated name "Management division of B company", "Management division of C company", or the like in the example shown in FIG. 6A) is written into the counterpart address filed 602 of the fax communication management report.

As with the fax communication management report shown in FIG. 6A, the conventional fax communication management report shown in FIG. 6B is provided with a start time field, counterpart address field, number field, communication mode field, number of sheets field, and result field. However, only transmission destination dial information notified from a client terminal is written into the counterpart address field of the fax communication management report shown in FIG. 6B, and abbreviated transmission destination name information is not written thereinto.

Figure 7A:
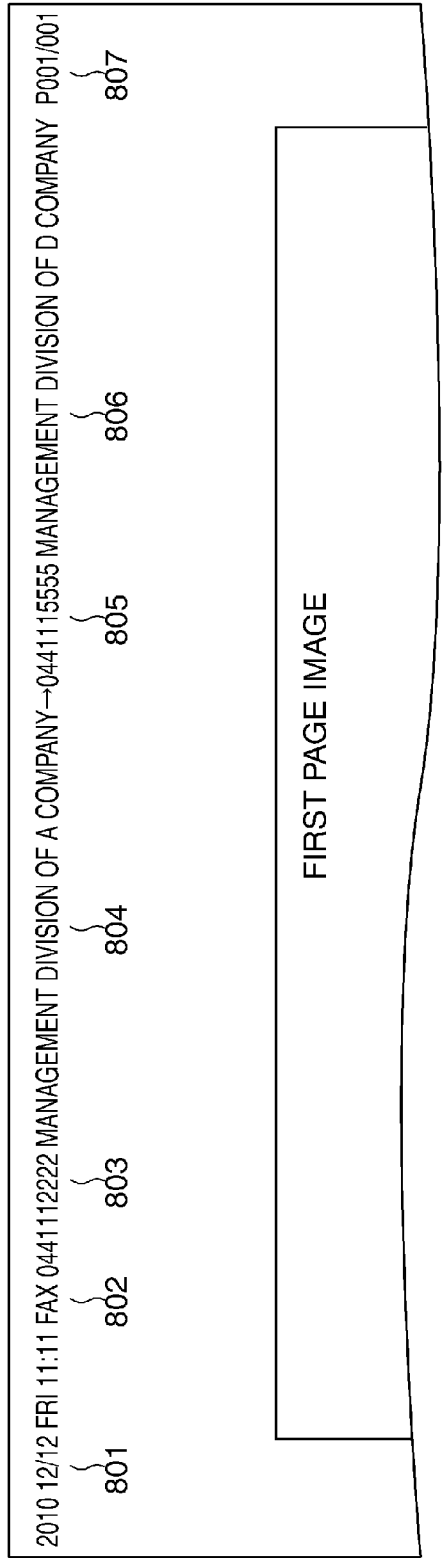
FIG. 7A is a view showing an example of a transmission source record header in a fax transmission image in the second embodiment.
Figure 7B:
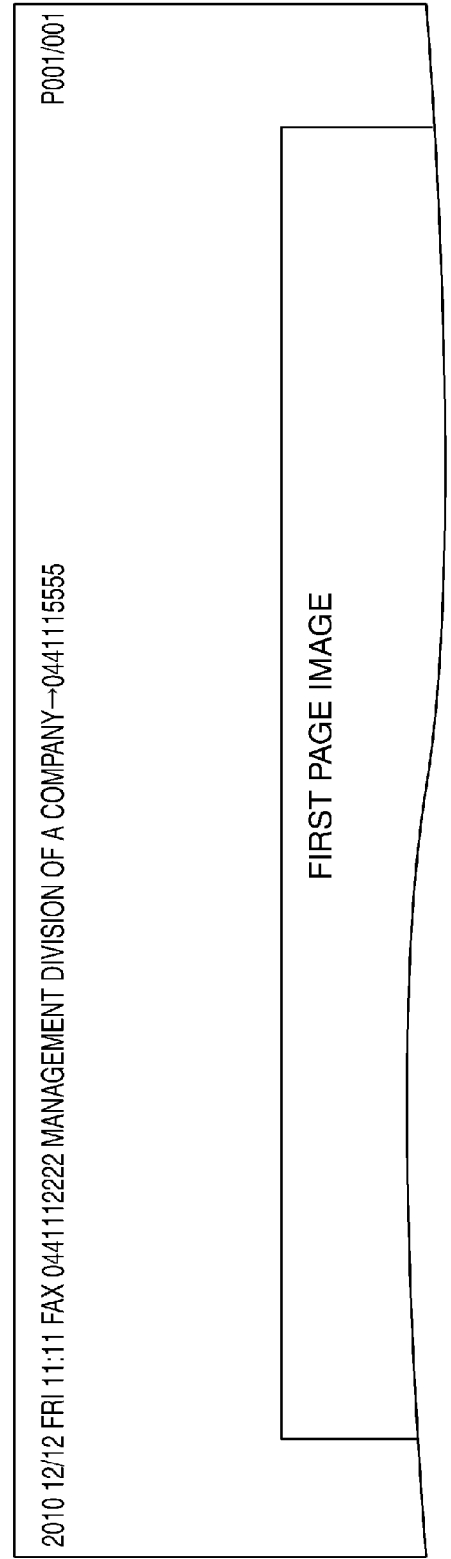
FIG. 7B is a view showing an example of a fax transmission image that includes a conventional transmission source record header.

FIG. 7A shows an example of a transmission source record header in a fax transmission image in the second embodiment, and FIG. 7B shows an example of a fax transmission image that includes a conventional transmission source record header.

As shown in FIG. 7A, the transmission source record header of the fax transmission image in the second embodiment includes a start time field 801 in which a transmission start time is indicated, a FAX symbol field 802 in which a communication type is indicated, a transmission source TEL field 803 in which transmission source TEL information is indicated, a transmission source abbreviated name field 804 in which transmission source abbreviated name information is indicated, a transmission destination TEL field 805 in which transmission destination TEL information is indicated, a transmission destination abbreviated name field 806 in which abbreviated transmission destination name information is indicated, and a page field 807 in which the number of transmission pages is indicated.

As previously described, in the second embodiment, the transmission source record header is created based on transmission destination dial information coincident with the transmission destination dial information acquired from a PC-FAX transmission request and all or part of transmission-related information registered in an address book that includes the transmission destination dial information.

Accordingly, in a case where the setting indicating that all the pieces of registered information (including abbreviated transmission destination name information) or at least abbreviated transmission destination name information is to be set as transmission object information has been stored in the system memory 206, abbreviated name information (an abbreviated name "Management division of D company" in the example shown in FIG. 7A) is written into the transmission destination abbreviated name field 806 of the transmission source record header.

As with the header shown in FIG. 7A, the conventional transmission source record header shown in FIG. 7B is provided with a start time field, FAX symbol field, transmission source TEL field, transmission source abbreviated name field, transmission destination TEL field, and page field, but is not provided with a transmission destination abbreviated field. Accordingly, no transmission destination abbreviated name is written into the header of FIG. 7B.

As described above, the setting as to whether an address book is to be used for facsimile transmission can be set by the user on the setting screen of the facsimile apparatus 105. The coincidence judgment condition can be set such that an address book, which includes transmission destination dial information fully or partially coincident with transmission destination dial information received from the client terminal 101 or 102, can be searched from the address book database of the facsimile apparatus 105. Furthermore, the transmission object information can be set such that all or part of transmission-related information registered in the address book found by the search can be acquired as transmission object information.

Accordingly, even if a PC-FAX transmission request received from the client terminal 101 or 102 only includes transmission destination dial information and transmission image data, it is possible to leave a facsimile transmission history that includes transmission-related information (e.g., abbreviated transmission destination name information) registered in an address book, which includes dial information fully or partially coincident with transmission destination dial information received from the client terminal, if such address book is registered in the address book database of the facsimile apparatus 105. It is also possible to add the abbreviated transmission destination name information to the transmission source record header.

It should be noted that if it is determined in step S404 or S406 in the PC-FAX transmission process shown in FIGS. 4A and 4B that the address book database is not registered with an address book that includes dial information fully or partially coincident with dial information acquired from the PC-FAX transmission request, it is possible to inform the user to that effect by displaying a notification on the operation/display unit 203.

In the second embodiment, a transmission history can be stored that includes all or part of transmission-related information registered in an address book. Alternatively, as with the first embodiment, it is possible to store a transmission history that only includes abbreviated transmission destination name information (transmission destination information) among pieces of transmission-related information. As with the second embodiment, the setting about coincidence judgment condition and transmission object information can also be set in the first embodiment.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-250540, filed Nov. 16, 2011, which is hereby incorporated by reference herein in its entirety.

What is claimed is:

1. A communication apparatus having a PC-FAX transmission function for performing facsimile transmission in response to a facsimile transmission request received from a client terminal through a network, comprising:
- at least one address book in which transmission destination dial information and corresponding transmission destination information are registered;
- an acquisition unit configured to acquire transmission destination dial information from the facsimile transmission request;
- a search unit configured to search said at least one address book to find an address book registered with transmission destination dial information coincident with the transmission destination dial information acquired by said acquisition unit;
- a transmission unit configured to perform facsimile transmission based on the transmission destination dial information acquired by said acquisition unit; and
- a storage unit configured, in a case where the address book registered with the transmission destination dial information coincident with the transmission destination dial information acquired by said acquisition unit is found by said search unit, to store a transmission history including the transmission destination dial information and transmission destination information that are registered in the address book found by said search unit.

2. The communication apparatus according to claim 1, wherein the transmission destination dial information acquired by said acquisition unit represents a transmission destination dial number input by a user through at least ten-keys of the client terminal.

3. The communication apparatus according to claim 1, wherein said at least one address book is provided in form of an address book database registered with a plurality of address books each including transmission destination dial information and abbreviated transmission destination name information, which is the corresponding transmission destination information, and
- said search unit searches the address book database to find an address book that includes transmission destination dial information coincident with the transmission destination dial information acquired by said acquisition unit.

4. The communication apparatus according to claim 1, wherein said at least one address book is provided in form of an address book database registered with a plurality of address books each including transmission destination dial information and abbreviated transmission destination name information, which is the corresponding transmission destination information, and
- said search unit searches the address book database to find an address book that includes transmission destination dial information whose lower digits coincide with lower digits of the transmission destination dial information acquired by said acquisition unit.

5. The communication apparatus according to claim 1, further including:
- a setting unit configured to set a facsimile transmission-related setting condition,
- wherein said at least one address book is provided in form of an address book database registered with a plurality of address books each including transmission destination dial information and abbreviated transmission destination name information, which is the corresponding transmission destination information,
- said search unit searches the address book database to find an address book that includes transmission destination dial information fully coincident with the transmission destination dial information acquired by said acquisition unit in a case where the setting condition represents a full coincidence search, and searches the address book database to find an address book that includes transmission destination dial information partially coincident with the transmission destination dial information acquired by said acquisition unit in a case where the setting condition represents a partial coincidence search, and
- said transmission unit acquires registered information corresponding to transmission object information represented by the setting condition from the address book that includes the transmission destination dial information fully or partially coincident with the transmission destination dial information acquired by said acquisition unit, and facsimile-transmits the acquired registered information.

6. A communication apparatus having a PC-FAX transmission function for performing facsimile transmission in response to a facsimile transmission request received from a client terminal through a network, comprising:
- at least one address book in which transmission destination dial information and corresponding transmission destination information are registered;
- an acquisition unit configured to acquire transmission destination dial information from the facsimile transmission request;
- a search unit configured to search said at least one address book to find an address book that includes transmission destination dial information coincident with the transmission destination dial information acquired by said acquisition unit;
- a transmission unit configured, in a case where the address book that includes the transmission destination dial information coincident with the transmission destination dial information acquired by said acquisition unit is found by said search unit, to perform facsimile transmission based on at least part of information registered in the address book found by said acquisition unit; and
- a storage unit configured to store a transmission history that includes at least the transmission destination information registered in the address book found by said search unit.

7. The communication apparatus according to claim 6, wherein the transmission destination dial information acquired by said acquisition unit represents transmission destination dial number input by a user through at least ten-keys of the client terminal.

8. The communication apparatus according to claim 6, further including:
- an addition unit configured to acquire abbreviated transmission destination name information, which is the transmission destination information, from the address book that includes transmission destination dial information coincident with the transmission destination dial information acquired by said acquisition unit and add the acquired name information to a transmission source record header.

9. The communication apparatus according to claim 6, wherein said at least one address book is provided in form of an address book database registered with a plurality of address books each including transmission destination dial information and abbreviated transmission destination name information, which is the corresponding transmission destination information, and said search unit searches the address book database to find an address book that includes transmission destination dial information coincident with the transmission destination dial information acquired by said acquisition unit.

10. The communication apparatus according to claim 6, wherein said at least one address book is provided in form of an address book database registered with a plurality of address books each including transmission destination dial information and abbreviated transmission destination name information, which is the corresponding transmission destination information, and said search unit searches the address book database to find an address book that includes transmission destination dial information whose lower digits coincide with lower digits of the transmission destination dial information acquired by said acquisition unit.

11. The communication apparatus according to claim 6, further including:

a setting unit configured to set a facsimile transmission-related setting condition, wherein said at least one address book is provided in form of an address book database registered with a plurality of address books each including transmission destination dial information and abbreviated transmission destination name information, which is the corresponding transmission destination information, said search unit searches the address book database to find an address book that includes transmission destination dial information fully coincident with the transmission destination dial information acquired by said acquisition unit in a case where the setting condition represents a full coincidence search, and searches the address book database to find an address book that includes transmission destination dial information partially coincident with the transmission destination dial information acquired by said acquisition unit in a case where the setting condition represents a partial coincidence search, and said transmission unit acquires registered information corresponding to transmission object information represented by the setting condition from the address book that includes the transmission destination dial information fully or partially coincident with the transmission destination dial information acquired by said acquisition unit, and facsimile-transmits the acquired registered information.

12. A control method for a communication apparatus having a PC-FAX transmission function for performing facsimile transmission in response to a facsimile transmission request received from a client terminal through a network, comprising:

an acquisition step of acquiring transmission destination dial information from the facsimile transmission request;

a search step of searching at least one address book, which is registered in the communication apparatus and in which transmission destination dial information and corresponding transmission destination information are registered, to find an address book that includes transmission destination dial information coincident with the transmission destination dial information acquired in said acquisition step;

a transmission step of performing facsimile transmission based on the transmission destination dial information acquired in said acquisition step; and a storage step, in a case where the address book registered with the transmission destination dial information coincident with the transmission destination dial information acquired in said acquisition step is found in said search step, of storing a transmission history including the transmission destination dial information and transmission destination information that are registered in the address book found in said search step.

13. A control method for a communication apparatus having a PC-FAX transmission function for performing facsimile transmission in response to a facsimile transmission request received from a client terminal through a network, comprising:

an acquisition step of acquiring transmission destination dial information from the facsimile transmission request;

a search step of searching at least one address book, which is registered in the communication apparatus and which includes transmission destination dial information and corresponding transmission destination information, to find an address book that includes transmission destination dial information coincident with the transmission destination dial information acquired in said acquisition step;

a transmission step, in a case where the address book that includes the transmission destination dial information coincident with the transmission destination dial information acquired in said acquisition step is found in said search step, of performing facsimile transmission based on at least part of information registered in the address book found in said acquisition step; and a storage step of storing a transmission history that includes at least the transmission destination information registered in the address book found in said search step.

14. A non-transitory computer-readable storage medium storing a program for causing a computer to execute the control method as set forth in claim 12.

15. A non-transitory computer-readable storage medium storing a program for causing a computer to execute the control method as set forth in claim 13.

* * * * *